United States Patent
Kim (10) Patent No.: US 9,424,183 B2
(45) Date of Patent: Aug. 23, 2016

(54) DATA STORAGE DEVICE AND METHOD FOR OPERATING THE SAME

(71) Applicant: SK hynix Inc., Gyeonggi-do (KR)

(72) Inventor: Yu Mi Kim, Gyeonggi-do (KR)

(73) Assignee: SK Hynix Inc., Gyeonggi-do (KR)

( * ) Notice: Subject to any disclaimer, the term of this patent is extended or adjusted under 35 U.S.C. 154(b) by 21 days.

(21) Appl. No.: 14/572,014

(22) Filed: Dec. 16, 2014

(65) Prior Publication Data

US 2016/0062884 A1 Mar. 3, 2016

(30) Foreign Application Priority Data

Aug. 26, 2014 (KR) .................. 10-2014-0111453

(51) Int. Cl.
*G06F 12/00* (2006.01)
*G06F 12/02* (2006.01)

(52) U.S. Cl.
CPC ........ *G06F 12/0246* (2013.01); *G06F 12/0253* (2013.01); *G06F 2212/7201* (2013.01); *G06F 2212/7205* (2013.01)

(58) Field of Classification Search
CPC ............ G06F 12/0246; G06F 12/0253; G06F 2212/7201; G06F 2212/7205
See application file for complete search history.

(56) References Cited

U.S. PATENT DOCUMENTS

2011/0320733 A1* 12/2011 Sanford .............. G06F 12/0871 711/135

FOREIGN PATENT DOCUMENTS

| KR | 1020130117560 | 10/2013 |
| KR | 1020140006283 | 1/2014 |

* cited by examiner

*Primary Examiner* — Shawn X Gu
(74) *Attorney, Agent, or Firm* — IP & T Group LLP (57) ABSTRACT

An operating method of a data storage device includes receiving a write request, determining whether it is possible to perform a first write operation of simultaneously writing a plurality of bits in each of memory cells coupled to one word line of a nonvolatile memory apparatus, and performing a garbage collection operation for the nonvolatile memory apparatus, according to a determination result, and generating first merged data.

18 Claims, 6 Drawing Sheets

DATA STORAGE DEVICE AND METHOD FOR OPERATING THE SAME

CROSS-REFERENCES TO RELATED APPLICATION

The present application claims priority under 35 U.S.C. §119(a) to Korean application number 10-2014-0111453, filed on Aug. 26, 2014, which is incorporated herein by reference in its entirety.

BACKGROUND

1. Technical Field

Various embodiments relate to a data storage device, and more particularly, to a method for a data storage device to write data.

2. Related Art

A semiconductor memory apparatus may be used to store data. Memory apparatuses may be classified into nonvolatile memory apparatuses and volatile memory apparatuses.

The volatile memory apparatuses may lose data stored therein when power is blocked. The volatile memory apparatuses include a static random access memory (SRAM), a dynamic random access memory (DRAM), and so forth. Generally, in a data processing system the volatile memory apparatuses, due to relatively high processing speed, are used as a buffer memory, a cache memory, a working memory, and the like.

Conversely, the nonvolatile memory apparatus may retain data stored therein even when not powered. The nonvolatile memory apparatuses include a flash memory such as a NAND flash memory and a NOR flash memory, a ferroelectric random access memory (FeRAM), a phase change random access memory (PCRAM), a magnetic random access memory (MRAM), a resistive random access memory (ReRAM), and so forth.

SUMMARY

In an embodiment of the present invention, an operating method of a data storage device may include: determining whether or not a first write operation, in which multi-bits are written at once in each of memory cells coupled to one word line of a nonvolatile memory apparatus, is available when a write request is received; and generating first merged data for the nonvolatile memory apparatus when it is determined that the first write operation is not available.

In an embodiment of the present invention, a data storage device may include: a controller suitable for determining whether a first write operation for write data corresponding to a write request is available, and performing a garbage collection operation according to a determination result; and a nonvolatile memory apparatus suitable for performing the first write operation under the control of the controller. The first write operation is performed to write multi-bits at once in each of memory cells coupled to one word line.

In an embodiment of the present invention, an operating method of a data storage device may include: receiving a write request; determining whether a length of write data corresponding to the write request is available for a one-shot program operation; performing a garbage collection operation on a nonvolatile memory apparatus to generate first merged data when the length of the write data is determined not to be available for the one-shot program operation; and performing the one-shot program operation for the write data on the nonvolatile memory apparatus.

According to the embodiments of the present invention, a data storage device may store a plurality of bits per a memory cell at once.

DETAILED DESCRIPTION

Hereinafter, a data storage device and an operating method thereof will be described below with reference to the accompanying drawings through various examples of embodiments. All "embodiments" referred to in this disclosure refer to embodiments of the present invention disclosed herein. The embodiments presented are mere examples and are not intended to limit the present invention. Rather, these embodiments are provided so that this disclosure will be thorough and complete, and will fully convey the scope of the present invention to those skilled in the art. Throughout the disclosure, reference numerals correspond directly to the like parts in the various figures and embodiments of the present invention.

The drawings are not necessarily to scale and in some instances, proportions may have been exaggerated to clearly illustrate features of the embodiments. In this specification, specific terms have been used. The terms are used to describe the present invention, and are not used to qualify the sense or limit the scope of the present invention.

It is also noted that in this specification, "and/or" represents that one or more of components arranged before and after "and/or" is included. Furthermore, "connected/coupled" refers to one component not only directly coupling another component but also indirectly coupling another component through an intermediate component. In addition, a singular form may include a plural form as long as it is not specifically mentioned in a sentence. Furthermore, "include/comprise" or "including/comprising" used in the specification represents that one or more components, steps, operations, and elements exists or are added.

Figure 1:
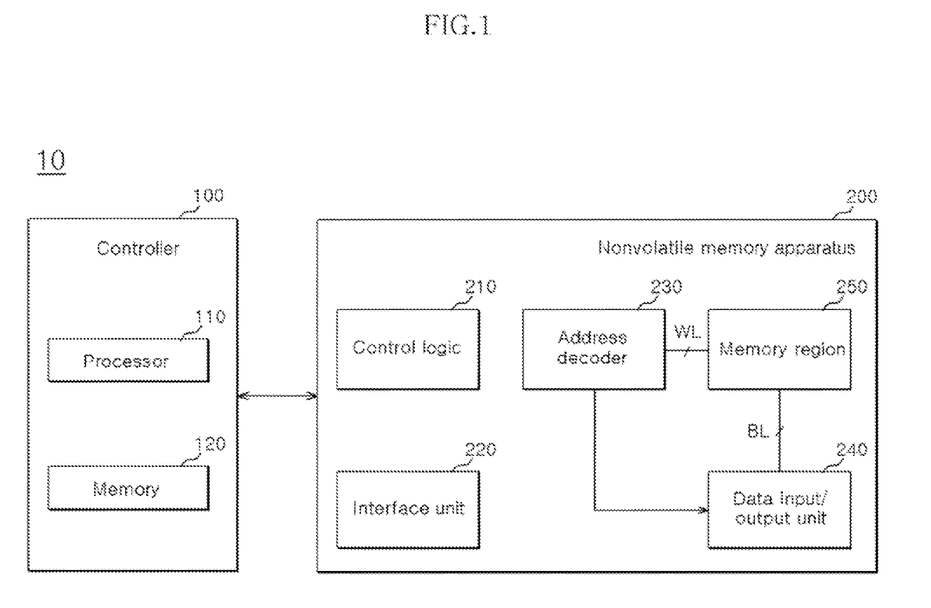
FIG. 1 is a block diagram illustrating a data storage device in accordance with an embodiment of the present invention.

FIG. 1 is a block diagram illustrating a data storage device 10 in accordance with an embodiment of the present invention.

The data storage device 10 may store the data provided from an external device (not shown), in response to a write request of the external device. Also, the data storage device 10 may provide stored data to the external device, in response to a read request of the external device. The data storage device 10 may be configured by a personal computer memory card international association (PCMCIA) card, a compact flash (CF) card, a smart media card, a memory stick, various multimedia cards in the form of an MMC, an eMMC, an RS-MMC and a MMC-micro, a secure digital (SD) card in the form of an SD, a mini-SD and a micro-SD, a universal flash storage (UFS), or a solid-state drive (SSD).

The data storage device 10 may include a controller 100 and a nonvolatile memory apparatus 200.

The controller 100 may include a processor 110 and a memory 120.

The processor 110 may control the general operations of the data storage device 10. The processor 110 may drive a software program for controlling the operations of the data storage device 10, on the memory 120. The processor 110 may control the nonvolatile memory apparatus 200 to perform first and second write operations. The first write operation may be performed to write multi-bits at once in each of memory cells coupled to a selected word line of the nonvolatile memory apparatus 200. The first write operation may be referred to as a one-shot program operation. The second write operation may be performed to write 1-bit to each of memory cells coupled to a selected word line of the nonvolatile memory apparatus 200.

The memory 120 may function as a working memory, a buffer memory or a cache memory of the processor 110. That is, the memory 120 may store a software program or firmware, and various program data to be driven by the processor 110 as working memory. The memory 120 may buffer data to be transmitted between the external device and the nonvolatile memory apparatus 200 as buffer memory. The memory 120 may temporarily store cache data as cache memory.

The nonvolatile memory apparatus 200 may include control logic 210, an interface unit 220, an address decoder 230, a data input/output unit 240, and a memory region 250.

The control logic 210 may control general operations of the nonvolatile memory apparatus 200, such as a write operation, that is, a program operation, a read operation and an erase operation, in response to a command provided from the controller 100.

The interface unit 220 may exchange various control signals including a command, an address and data, with the controller 100. The interface unit 220 may transfer the various control signals and the data to the internal units of the nonvolatile memory apparatus 200.

The address decoder 230 may decode a row address and a column address transmitted thereto. The address decoder 230 may control word lines WL to be selectively driven according to the decoded row address. The address decoder 230 may control the data input/out unit 240 such that bit lines BL are selectively driven according to the decoded column address.

The data input/output unit 240 may transmit the data transmitted from the interface unit 220 to the memory region 250 through the bit lines BL. The data input/output unit 240 may transmit the data read through the bit lines BL from the memory region 250 to the interface unit 220.

The memory region 250 may be electrically coupled with the address decoder 230 through the word lines WL, and may be electrically coupled with the data input/out unit 240 through the bit lines BL. The memory region 250 may include, for example, a memory cell array with a three-dimensional (3D) structure.

The memory region 250 may include a plurality of memory cells (not shown) which are disposed at respective regions where the word lines WL and the bit lines BL cross each other. The memory cells may be distinguished according to the number of data bits stored in each memory cell. For example, the memory cells may be classified into single level cells (SLCs) each of which stores 1-bit and multi-level cells (MLCs) each of which stores at least multi-bits, for example, 2-bits.

Figure 2:
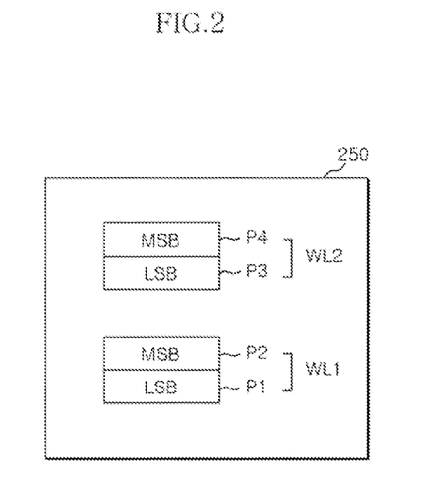
FIG. 2 is a detailed diagram of a memory region shown in FIG. 1.

FIG. 2 is a detailed diagram of the memory region 250 shown in FIG. 1. FIG. 2 shows a state in which addresses are allocated by the unit of a page to the memory region 250.

The memory region 250 may include first to fourth pages P1 to P4. Although 4 pages are shown in FIG. 2 as an example, it is to be noted that the number of pages is not limited to 4 pages. The first to fourth pages P1 to P4 may be allocated with corresponding addresses to be respectively accessed.

The first and second pages P1 and P2 may share a first word line WL1. The first and second pages P1 and P2 may be respectively accessed by driving the first word line WL1. The third and fourth pages P3 and P4 may share a second word line WL2. The third and fourth pages P3 and P4 may be respectively accessed by driving the second word line WL2. Although it is shown in FIG. 2 that 2 pages share one word line, the number of pages which share a word line is not limited to 2 pages. As will be described later, the number of pages sharing a word line may be determined according to the number of bits to be stored in each memory cell.

The first to fourth pages P1 to P4 may be formed not only by physical regions but also by logic regions. Each of the first to fourth pages P1 to P4 may be considered as being formed by the data bits stored in memory cells coupled to corresponding word lines. Each of the first to fourth pages P1 to P4 may be considered as storing the data bits stored in the memory cells coupled to the corresponding word lines.

When memory cells are multi-level cells each of which stores 2-bits the memory cells may store a least significant bit LSB and a most significant bit MSB. The least significant bit LSB and the most significant bit MSB, which are stored in the memory cell, may form an LSB page and an MSB page, respectively. For example, when the least significant bit LSB stored in a memory cell coupled to the first word line WL1 is stored in the first page P1, the first page P1 may be the LSB page, and when the most significant bit MSB stored in a memory cell coupled to the first word line WL1 is stored in the second page P2, the second page P2 may be the MSB page. Further, when the least significant bit LSB stored in a memory cell coupled to the second word line WL2 is stored in the third page P3, the third page P3 may be the LSB page, and when the most significant bit MSB stored in a memory cell coupled to the second word line WL2 is stored in the fourth page P4, the fourth page P4 may be the MSB page.

Figure 3:
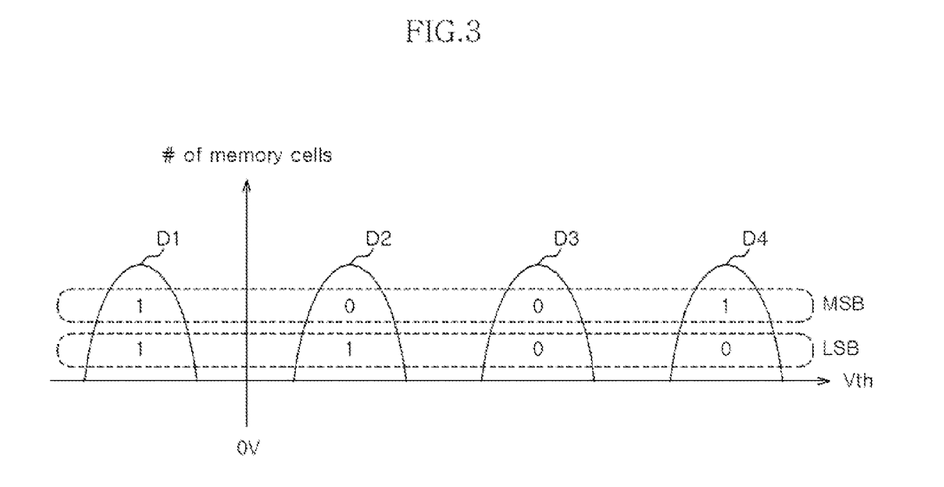
FIG. 3 is a diagram illustrating a threshold voltage distribution of memory cells.

FIG. 3 is a diagram showing a threshold voltage distribution of memory cells. The threshold voltage distribution may be depicted on a graph in which the horizontal axis represents the level of a threshold voltage (Vth) and the vertical axis represents the number of memory cells. In FIG. 3, it is presumed that each memory cell stores 2-bits.

An operation of writing data in a memory cell may be performed by applying a bias voltage to the memory cell such that the corresponding memory cell has a threshold voltage of a predetermined range. The memory cell may have the threshold voltage of the predetermined range, according to the data stored therein. For example, a memory cell for storing "11" may have a threshold voltage which forms a first distribution D1. A memory cell for storing "01" may have a threshold voltage which forms a second distribution D2. A memory cell for storing "00" may have a threshold voltage which forms a third distribution D3. A memory cell for storing "10" may have a threshold voltage which forms a fourth distribution D4.

Figure 4:
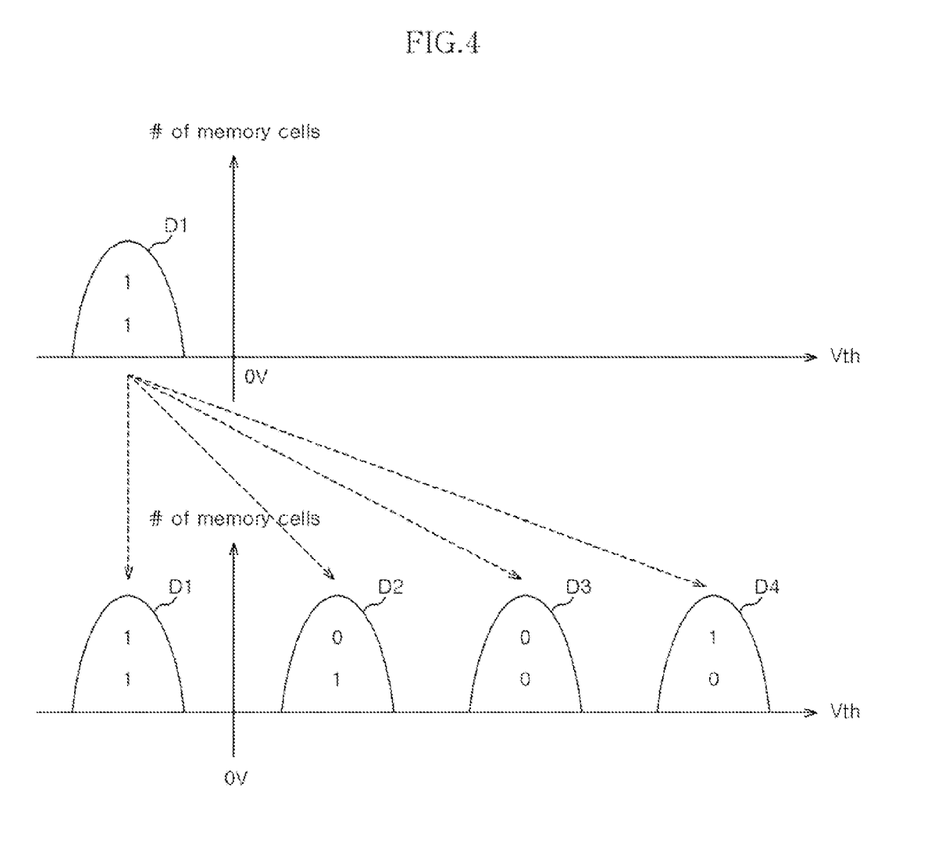
FIG. 4 is a diagram for describing a change in a threshold voltage distribution of the memory cells when performing a first write operation.

FIG. 4 is a diagram for describing a change in the threshold voltage distribution of memory cells when performing a first write operation, that is, a one-shot program operation.

The nonvolatile memory apparatus 200 may perform the first write operation to write multi-bits at once in each of memory cells under the control of the controller 100. The nonvolatile memory apparatus 200 may perform the first write operation for the memory cells coupled to a selected word line. The nonvolatile memory apparatus 200 may perform the first write operation to store data at once in multi-pages which share the word line.

In FIG. 4, each of the memory cells stores 2-bits. The memory cells, which are to be programmed, have to be erased prior to being programmed. The memory cells exist in an erased state before the first write operation is performed. The memory cells in the erased state may store "11", and thus may form the first distribution D1.

If the first write operation is performed, the threshold voltage of a memory cell may correspond to any one of the 4 threshold voltage distributions D1, D2, D3 and D4. A memory cell on which the first write operation is performed, may store the least significant bit LSB and the most significant bit MSB.

Figure 5:
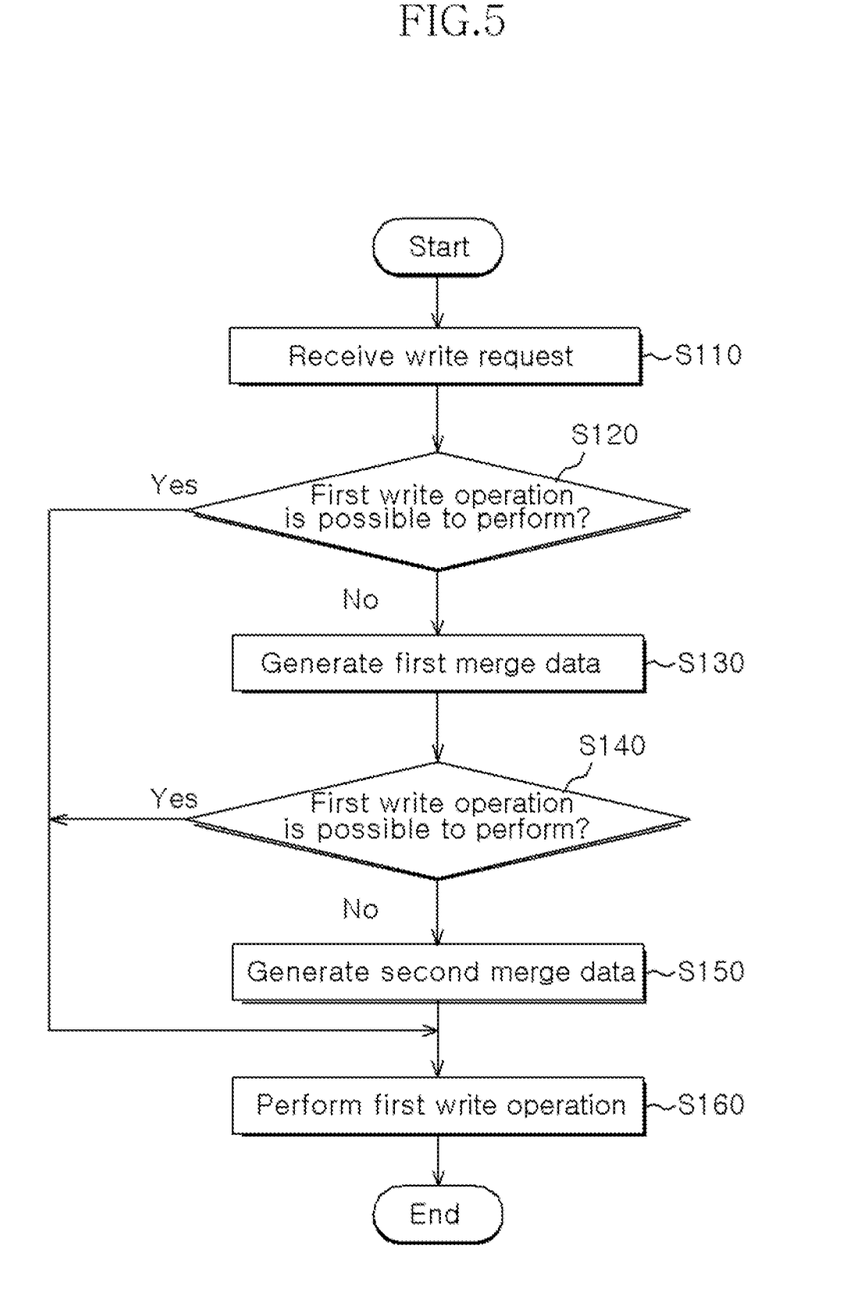
FIG. 5 is a flow chart for describing an operating method of the data storage device shown in FIG. 1.

FIG. 5 is a flow chart for describing an operating method of the data storage device 10 shown in FIG. 1.

The controller 100 may provide data for which the first write operation, that is, a one-shot program operation, is to be performed, to the nonvolatile memory apparatus 200 through the process by a performance unit of the first write operation. The performance unit of the first write operation may be the number of bits corresponding to pages which share one word line. The performance unit of the first write operation may be the number of bits needed to simultaneously write a plurality of bits in each of the memory cells coupled to one word line.

In step S110, a write request may be received. The data storage device 10 may receive write data along with the write request, from the external device.

In step S120, it may be determined whether it is possible to perform the first write operation for the write data. That is, it operation is determined whether a length of write data corresponding to the write request is available for a one-shot program. For example, the processor 110 may determine whether it is possible to perform the first write operation, based on whether the write data conforms to the performance unit of the first write operation. The processor 110 may compare the size or the length, of the write data, and the performance unit of the first write operation, that is, a reference value, and the processor 110 may determine whether it is possible to perform the first write operation, based on a comparison result. The processor 110 may determine that it is possible to perform the first write operation for the write data, when the size of the write data is equal to or larger than the reference value. The processor 110 may determine that it is not possible to perform the first write operation for the write data, when the size of the write data is smaller than the reference value.

When it is determined that it is possible to perform the first write operation (YES), the process may proceed to step S160.

In the step S160, the first write operation may be performed for the write data. The nonvolatile memory apparatus 200 may simultaneously write a plurality of bits in each of the memory cells, which are coupled to one word line, and store the write data under the control of the processor 110. Then, the process may end.

In the step S120, when it is determined that it is not possible to perform the first write operation (NO), the process may proceed to step S130.

In the step S130, as a garbage collection operation for the nonvolatile memory apparatus 200 is performed, first merged data may be generated. The processor 110 may perform the garbage collection operation to collect the valid data stored in the nonvolatile memory apparatus 200, and may generate the first merged data by adding the collected valid data to the write data.

In step S140, it may be determined whether it is possible to perform the first write operation for the first merged data. For example, the processor 110 may determine whether it is possible to perform the first write operation, based on whether the first merged data conforms to the performance unit of the first write operation. The processor 110 may compare the size of the first merged data and a reference value, and may determine whether it is possible to perform the first write operation, based on a comparison result. When the size of the first merged data is equal to or larger than the reference value, the processor 110 may determine that it is possible to perform the first write operation for the first merged data. When the size of the first merged data is smaller than the reference value, the processor 110 may determine that it is not possible to perform the first write operation for the first merged data.

When it is determined that it is possible to perform the first write operation (YES), the process may proceed to the step S160.

In the step S160, the first write operation may be performed for the first merged data. To store the first merged data under the control of the processor 110, the nonvolatile memory apparatus 200 may simultaneously write a plurality of bits in the respective memory cells, which are coupled to one word line. Then, the process may end.

In the step S140, when it is determined that it is not possible to perform the first write operation (NO), the process may proceed to step S150.

In the step S150, second merged data may be generated. The processor 110 may generate the second merged data by adding dummy data to the first merged data. The processor 110 may generate the second merged data, which has an increased size when compared to the size of the first merged data, by adding the dummy data to the first merged data. The processor 110 may add the dummy data to the first merged data such that the second merged data conforms to the performance unit of the first write operation.

In the step S160, the first write operation may be performed for the second merged data. To store the second merged data under the control of the processor 110, the nonvolatile memory apparatus 200 may simultaneously write a plurality of bits in the memory cells, which are coupled to one word line.

That is, when the write data does not conform to the performance unit of the first write operation, the controller 100 may generate the merged data, which conforms to the performance unit of the first write operation, by adding the valid data or the dummy data to the write data, and the controller 100 may provide the merged data to the nonvolatile memory apparatus 200.

Figure 6:
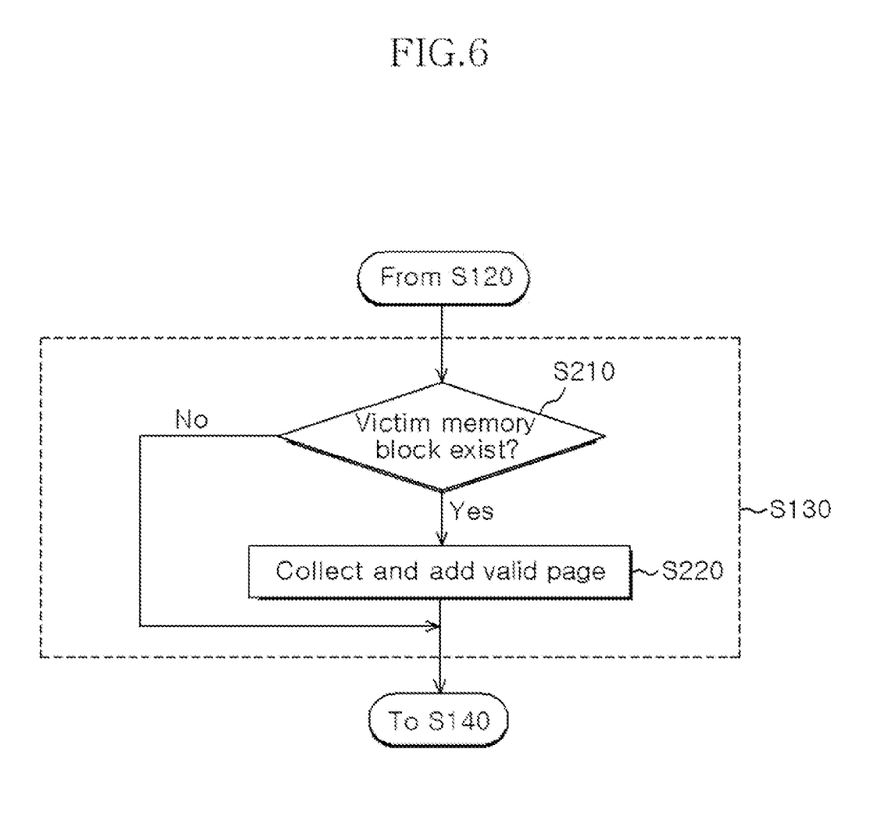
FIG. 6 is a flow chart for describing a process in which first merged data is generated by performing a garbage collection operation for a nonvolatile memory apparatus.

FIG. 6 is a flow chart for describing a process in which first merged data is generated by performing a garbage collection operation for the nonvolatile memory apparatus 200. The process shown in FIG. 6 may correspond to the step S130 of FIG. 5.

In step S210, it may be determined whether a victim memory block exists for the memory region 250. The victim memory block may be determined based on the configuration ratio of valid pages storing valid data, and invalid pages storing invalid data. The victim memory block may be determined based on whether a cost for copying valid pages is equal to or less than a predetermined value. When the victim memory block exists (YES), the process may proceed to step S220.

In the step S220, the valid pages included in the victim memory block may be collected and added to the write data. By adding the collected valid pages to the write data, the processor 110 may generate the first merged data, which has an increased size when compared to the write data. Then, the process may proceed to step S140.

In the step S210, when the victim memory block does not exist (NO), the process may proceed to step S140. When the victim memory block does not exist as a result of performing the garbage collection operation, the processor 110 may not collect a valid page to be added to the write data. Then, the processor 110 may generate the first merged data substantially the same as the write data, without adding a valid page to the write data.

Figure 7:
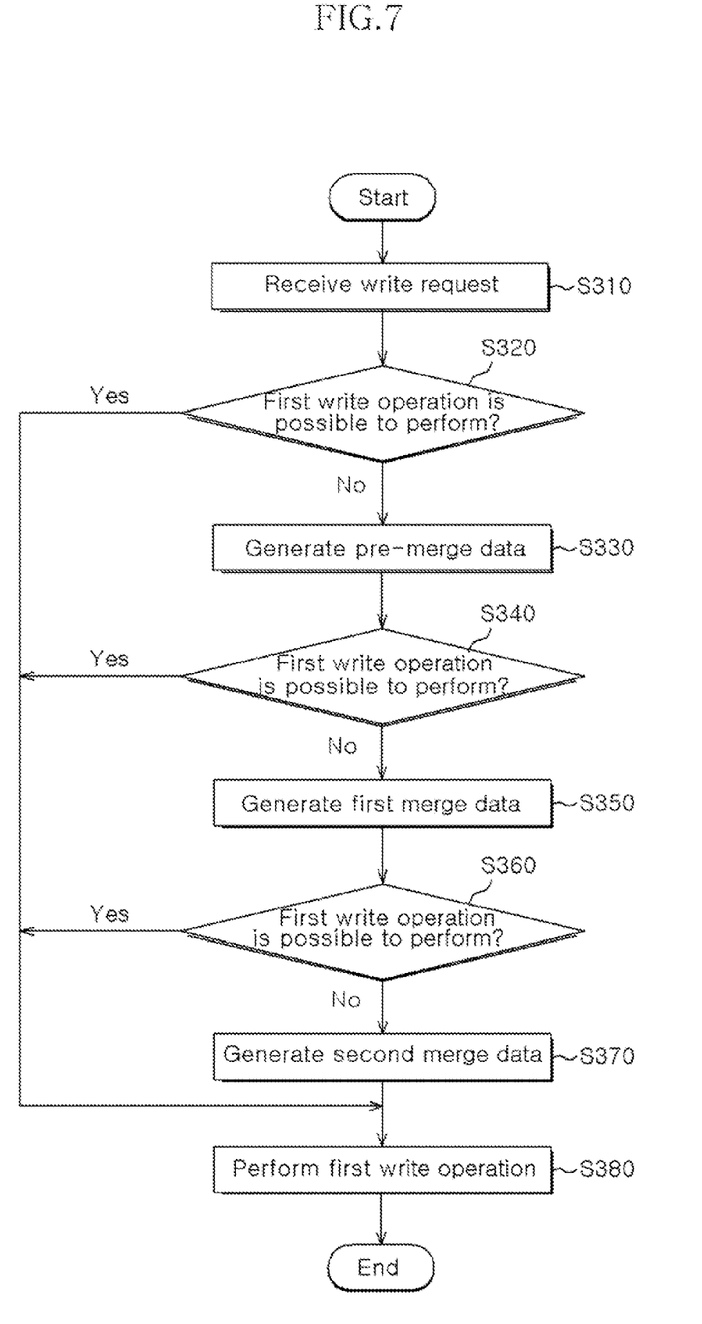
FIG. 7 is a flow chart for describing an operating method of the data storage device shown in FIG. 1.

FIG. 7 is a flow chart for describing an operating method of the data storage device 10 shown in FIG. 1. The process shown in FIG. 7 may be substantially similar to the process shown in FIG. 5, except step S330 and step S340. That is, respective steps S310, S320, S350, S360, S370 and S380 in FIG. 7 may be substantially similar to the steps S110, S120, S130, S140, S150 and S160 shown in FIG. 5. Accordingly, the steps S330 and S340 will be mainly described below.

In the step S320, when it is determined that it is not possible to perform the first write operation for the write data (NO), the process may proceed to the step S330.

In the step S330, pre-merged data may be generated. The processor 110 may generate the pre-merged data by adding caching data which is cached in the memory 120, to the write data. By adding the caching data to the write data, the processor 110 may generate the pre-merged data, which has an increased size when compared to the write data.

In the step S340, it may be determined whether it is possible to perform the first write operation for the pre-merged data. For example, the processor 110 may determine whether it is possible to perform the first write operation, based on whether the pre-merged data conforms to the performance unit of the first write operation. The processor 110 may compare the size of the pre-merged data and a reference value, and determine whether it is possible to perform the first write operation, based on a comparison result. When the size of the pre-merged data is equal to or larger than the reference value, the processor 110 may determine that it is possible to perform the first write operation for the pre-merged data. When the size of the pre-merged data is smaller than the reference value, the processor 110 may determine that it is not possible to perform the first write operation for the pre-merged data.

When it is determined that it is possible to perform the first write operation (YES), the process may proceed to step S380.

When it is determined that it is not possible to perform the first write operation (NO), the process may proceed to the step S350. In the step S350, the processor 110 may generate the first merged data by adding the valid data collected by performing the garbage collection operation for the nonvolatile memory apparatus 200, to the pre-merged data.

Summarizing these, when the write data does not conform to the performance unit of the first write operation, the controller 100 may generate the merged data, which conforms to the performance unit of the first write operation, by adding the caching data to the write data, and may provide the merged data to the nonvolatile memory apparatus 200.

Figure 8:
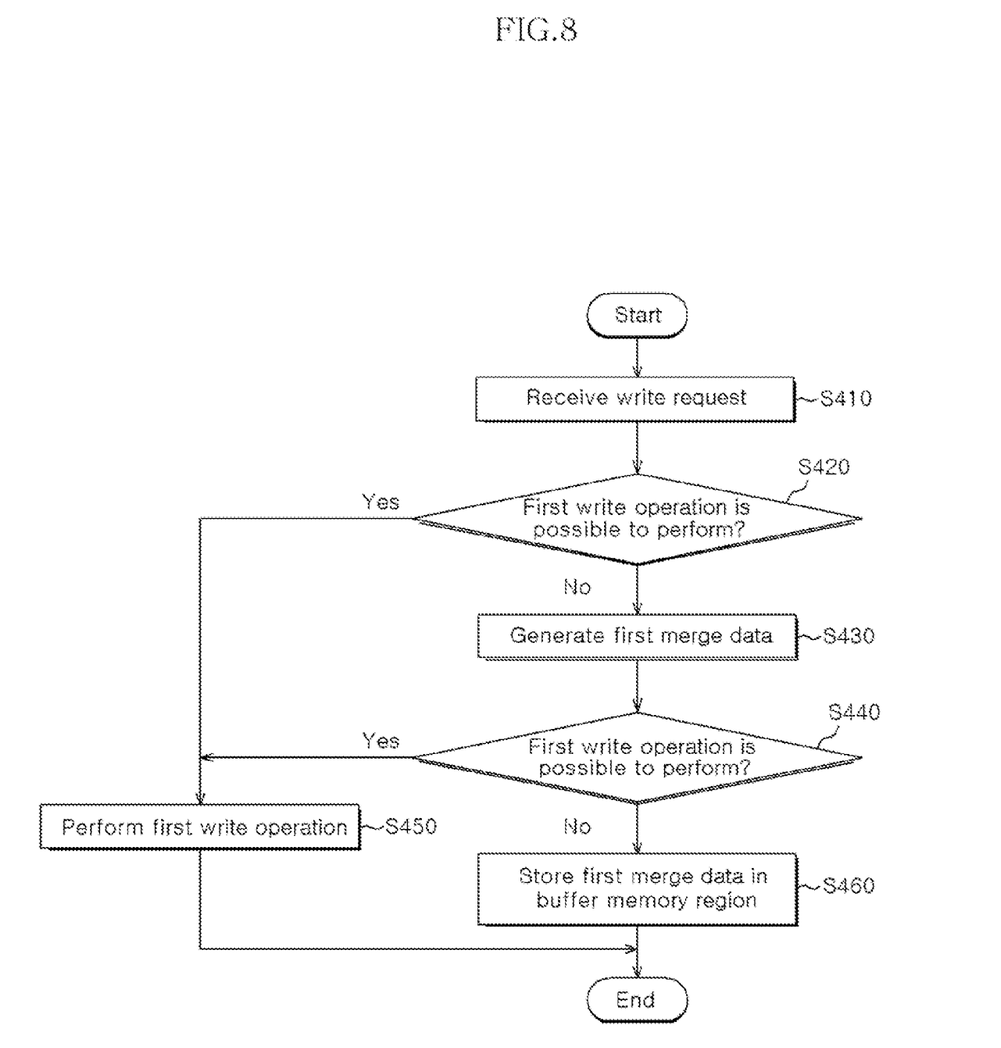
FIG. 8 is a flow chart for describing an operating method of the data storage device shown in FIG. 1.

FIG. 8 is a flow chart for describing an operating method of the data storage device 10 shown in FIG. 1.

Respective steps S410, S420, S430, S440 and S450 in FIG. 8 may be substantially similar to the steps S110, S120, S130, S140 and S160 shown in FIG. 5. Accordingly, detailed descriptions thereof will be omitted.

In the step S440, when it is determined that it is not possible to perform the first write operation for the first merged data (NO), the process may proceed to step S460.

In the step 460, the first merged data may be stored in the buffer memory region of the nonvolatile memory apparatus 200. For example, when the first merged data substantially the same as the write data is generated as a valid page to be added to the write data, is not collected even though the garbage collection operation is performed or when the first merged data does not conform to the performance unit of the first write operation, the nonvolatile memory apparatus 200 may store the first merged data in a separate buffer memory region (not shown). Each of the memory cells of the buffer memory region may be a single level cell which stores 1-bit or a multi-level cell which stores only a least significant bit. The nonvolatile memory apparatus 200 may store the first merged data in the buffer memory region through the second write operation. The second write operation may be performed to write 1-bit to each of the memory cells, which are coupled to one word line. The data stored in the buffer memory region may be added to other data as a result of subsequently performing the garbage collection operation, and may thereby be stored in the memory region 250 through the first write operation. Then, the process may end.

While various embodiments have been described above, it will be understood to those skilled in the art that the embodiments described are by way of example only. Accordingly, the data storage device and the operating method thereof described herein should not be limited based on the described embodiments.

Further, it is noted that the present invention may be achieved in various ways through substitution, change, and modification, by those skilled in the art without departing from the scope of the present invention as defined by the following claims.

What is claimed is:

1. An operating method of a data storage device, comprising:
   determining whether or not a first write operation, in which multi-bits are written at once in each memory cell coupled to one word line of a nonvolatile memory apparatus, is available when a write request is received; and
   generating first merged data for the nonvolatile memory apparatus when it is determined that the first write operation is not available,
   wherein the determining of whether or not the first write operation is available comprises:
   comparing a size of write data corresponding to the write request and a reference value; and
   determining whether the first write operation for the write data is available based on a comparison result.

2. The operating method according to claim 1, wherein the generating of the first merged data includes:
   performing a garbage collection operation on the nonvolatile memory apparatus.

3. The operating method according to claim 2, wherein the generating of the first merged data comprises:
   adding valid data collected as a result of the garbage collection operation to the write data corresponding to the write request.

4. The operating method according to claim 2, further comprising:
   additionally determining whether the first write operation for the first merged data is available.

5. The operating method according to claim 4, further comprising:
performing the first write operation for the first merged data according to a result of the additionally determining.

6. The operating method according to claim 5, further comprising:
storing the first merged data in a buffer memory region of the nonvolatile memory apparatus through a second write operation according to the result of the additionally determining,
wherein the second write operation is performed to write 1-bit in each of memory cells coupled to one word line of the nonvolatile memory apparatus.

7. The operating method according to claim 4, further comprising:
adding dummy data to the first merged data and generating second merged data according to a result of the additionally determining; and
performing the first write operation for the second merged data.

8. The operating method according to claim 1, wherein the reference value is a number of bits corresponding to pages that share one word line.

9. The operating method according to claim 1, further comprising:
performing the first write operation for the write data on the nonvolatile memory apparatus, according to the determined write operation availability result.

10. The operating method according to claim 1, wherein the determining of whether or not the first write operation is available further comprises:
adding caching data cached in a memory to the write data to generate pre-merged data according to the determined write operation availability result;
comparing a size of the pre-merged data with the reference value; and
secondarily determining whether the first write operation for the pre-merged data is available, based on a comparison result.

11. A data storage device comprising:
a controller suitable for determining whether a first write operation for write data corresponding to a write request is available, and performing a garbage collection operation according to a determination result; and
a nonvolatile memory apparatus suitable for performing the first write operation under control of the controller,
wherein the first write operation is performed to write multi-bits at once in each memory cell coupled to one word line,
wherein the controller compares a size of the write data with a reference value, and determines whether the first write operation for the write data is available based on a comparison result.

12. The data storage device according to claim 11, wherein the reference value is a number of bits corresponding to pages that share one word line.

13. The data storage device according to claim 11, wherein the controller comprises a memory suitable for storing caching data, and determines whether the first write operation for pre-merged data, which is generated by adding the caching data to the write data according to the determination result, is available.

14. The data storage device according to claim 11, wherein the controller determines whether the first write operation for first merged data, which is generated by adding valid data collected by the garbage collection operation to the write data, is available.

15. The data storage device according to claim 14, wherein the controller generates second merged data by adding dummy data to the first merged data when it is determined that the first write operation for the first merged data is not available.

16. The data storage device according to claim 15, wherein the second merged data conforms to a performance unit of the first write operation.

17. The data storage device according to claim 14,
wherein the nonvolatile memory apparatus comprises a buffer memory region suitable for storing the first merged data by a second write operation, when it is determined that the first write operation for the first merged data is not available, and
wherein the second write operation is performed to write 1-bit in each memory cell coupled to one word line.

18. An operating method of a data storage device, comprising:
receiving a write request;
determining whether a length of write data corresponding to the write request is available for a one-shot program operation by comparing a size of the write data and a reference value;
performing a garbage collection operation on a nonvolatile memory apparatus to generate first merged data when the length of the write data is determined not to be available for the one-shot program operation and performing the one-shot program operation for the first merged data on the nonvolatile memory apparatus; and
performing the one-shot program operation for the write data on the nonvolatile memory apparatus when the size of the write data is determined to be available for the one-shot program operation.

* * * * *